US005202100A

United States Patent [19]
Nagel et al.

[11] Patent Number: 5,202,100
[45] Date of Patent: Apr. 13, 1993

[54] METHOD FOR REDUCING VOLUME OF A RADIOACTIVE COMPOSITION

[75] Inventors: Christopher J. Nagel, Boston, Mass.; Robert D. Bach, Grosse Pointe, Mich.; William M. Haney, III, Boston, Mass.

[73] Assignee: Molten Metal Technology, Inc., Waltham, Mass.

[21] Appl. No.: 788,804

[22] Filed: Nov. 7, 1991

[51] Int. Cl.$^5$ ............................................. C22B 60/00
[52] U.S. Cl. ................................................ 423/5; 423/2; 423/19; 252/626; 75/393; 110/237
[58] Field of Search ............... 252/626; 423/2, 5, 19, 423/DIG. 20; 75/393, 402; 110/237

[56] References Cited

U.S. PATENT DOCUMENTS

| | | | |
|---|---|---|---|
| 2,914,399 | 11/1959 | Dwyer et al. | 75/398 |
| 3,154,379 | 10/1964 | Benedict et al. | 423/5 |
| 3,282,681 | 11/1966 | Knighton et al. | 75/396 |
| 3,420,639 | 1/1969 | Mullins | 423/5 |
| 3,495,975 | 2/1970 | Grimes et al. | 75/393 |
| 3,672,846 | 6/1972 | McNeese et al. | 75/393 |
| 3,708,267 | 1/1973 | Avogadro et al. | 423/5 |
| 3,781,403 | 12/1973 | Baes, Jr. et al. | 423/5 |
| 4,145,396 | 3/1979 | Grantham | 423/22 |
| 4,395,367 | 7/1983 | Rohrmann et al. | 252/629 |
| 4,574,714 | 3/1986 | Bach et al. | 110/346 |
| 4,591,454 | 5/1986 | Ohtsuka et al. | 252/626 |
| 4,602,574 | 7/1986 | Bach et al. | 110/346 |
| 4,657,585 | 4/1987 | Yazawa et al. | 75/63 |
| 4,895,678 | 1/1990 | Ohtsuka et al. | 252/632 |
| 5,041,193 | 8/1991 | Grantham | 204/1.5 |

FOREIGN PATENT DOCUMENTS 55-44917  3/1980  Japan .

OTHER PUBLICATIONS

Abe et al. Proc. of Waste Mgmt. 1985, pp. 375-379 (1985).
Heshmatpour et al., "The Effects of Slag Composition & Process Variables on Decontamination of Metallic Wastes by Melt Refining", *Oak Ridge National Laboratory*, ORNL/TM-7501 (1981).
Heshmatpour et al., "Decontamination of Transuranic Waste Metal by Melt Refining", Oak Ridge Nat'l Lab. ORNL/TM-7951 (1981).
Heshmatpour et al., Nuc. Chem. Waste Mgmt., vol. 2, pp. 25-31 (1981).
Johnson, J. Nuc. Matl., vol. 154, pp. 169-180 (1988).
Seitz et al., "Decontamination of Metals Containing Plutonium & Americium", Argonne Nat'l Laboratory, ANL-78-13 (1979).
Uda et al., Nuc. Tech., vol. 79, pp. 328-337 (1987).
Uda et al., Nuc. Tech., vol. 73, pp. 109-115 (1986).
Uda et al., Nuc. Tech., vol. 72, pp. 178-183 (1986).

*Primary Examiner*—Daniel D. Wasil
*Assistant Examiner*—Ngoclan T. Mai
*Attorney, Agent, or Firm*—Hamilton, Brook, Smith & Reynolds

[57] ABSTRACT

A method is disclosed for reducing the volume of a radioactive composition by separating a radioactive first component from a second component of the radioactive composition. The method includes directing the radioactive composition into a reaction zone. The reaction zone includes a molten bath, wherein oxidation of a component of the radioactive composition in the molten bath will cause separation of the radioactive first component from the second component. An oxidizing agent is directed into the molten bath, which oxidizes a component of the radioactive composition, whereby the radioactive first component is separated from the second component. The net volume of the radioactive composition is thereby reduced.

29 Claims, 5 Drawing Sheets

METHOD FOR REDUCING VOLUME OF A RADIOACTIVE COMPOSITION

BACKGROUND OF THE INVENTION

Radioactive waste has many forms, such as spent fuel from nuclear reactors, and contaminated glassware and spent ion exchange resins generated by medical and chemical laboratories. Radioactive components are often only a small percentage, by weight, of the total weight of such wastes. However, the half life of radioactive waste can be hundreds or thousands of years, thus requiring a permanent disposal solution.

Typically, radioactive waste is disposed of by burial in specially prepared disposal sites, such as in land fills, which are lined or capped, or in deep underground mines. However, large volumes of radioactive wastes are difficult to contain. For example, landfills can develop leaks over time, thereby allowing radioactive components to leach from the landfill site and into municipal water supplies. Also, mines can become flooded and contaminate water which subsequently escapes. Further, suitable space for disposal of radioactive waste is limited. The rate at which radioactive waste is generated is also much greater than the rate at which new burial sites are becoming available.

Therefore, a need exists for a method of reducing the volume of radioactive compositions, such as radioactive wastes, which include a radioactive component.

SUMMARY OF THE INVENTION

The present invention relates to a method for reducing the volume of a radioactive composition by separating a radioactive first component from a second component of the radioactive composition.

The method includes directing the radioactive composition into a reaction zone. The reaction zone includes a molten bath, wherein oxidation of a component of the radioactive composition in the molten bath will cause separation of the radioactive first component from the second component. A first oxidizing agent is directed into the molten bath, whereby a component of the radioactive composition is oxidized, thereby causing separation of the radioactive first component from the second component.

This invention has many advantages. For example, either the radioactive first component or the second component can be oxidized. In addition, the oxidized component and the other component can be separated by changing the solubility, polarity or density of either of the components or by allowing either of the components to volatilize and thereby escape from the molten bath. Also, the radioactive component can be dissolved in either a molten metal layer of the molten bath or a slag of the bath for subsequent disposal. Radioactive material in a metal or slag are generally more easily contained than in mixed waste, such as untreated radioactive wastes. Alternatively, the radioactive component can be volatilized to form a radioactive gas which is treated separately, such as by scrubbing and subsequent reaction to form relatively stable compounds which can be disposed of safely and inexpensively. Also, separation of radioactive from non-radioactive materials reduces the volume of radioactive material that needs to be vitrified or stored in land fills or in deep underground mines.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principle features of this invention can be employed in various embodiments without departing from the scope of the invention.

Figure 1:
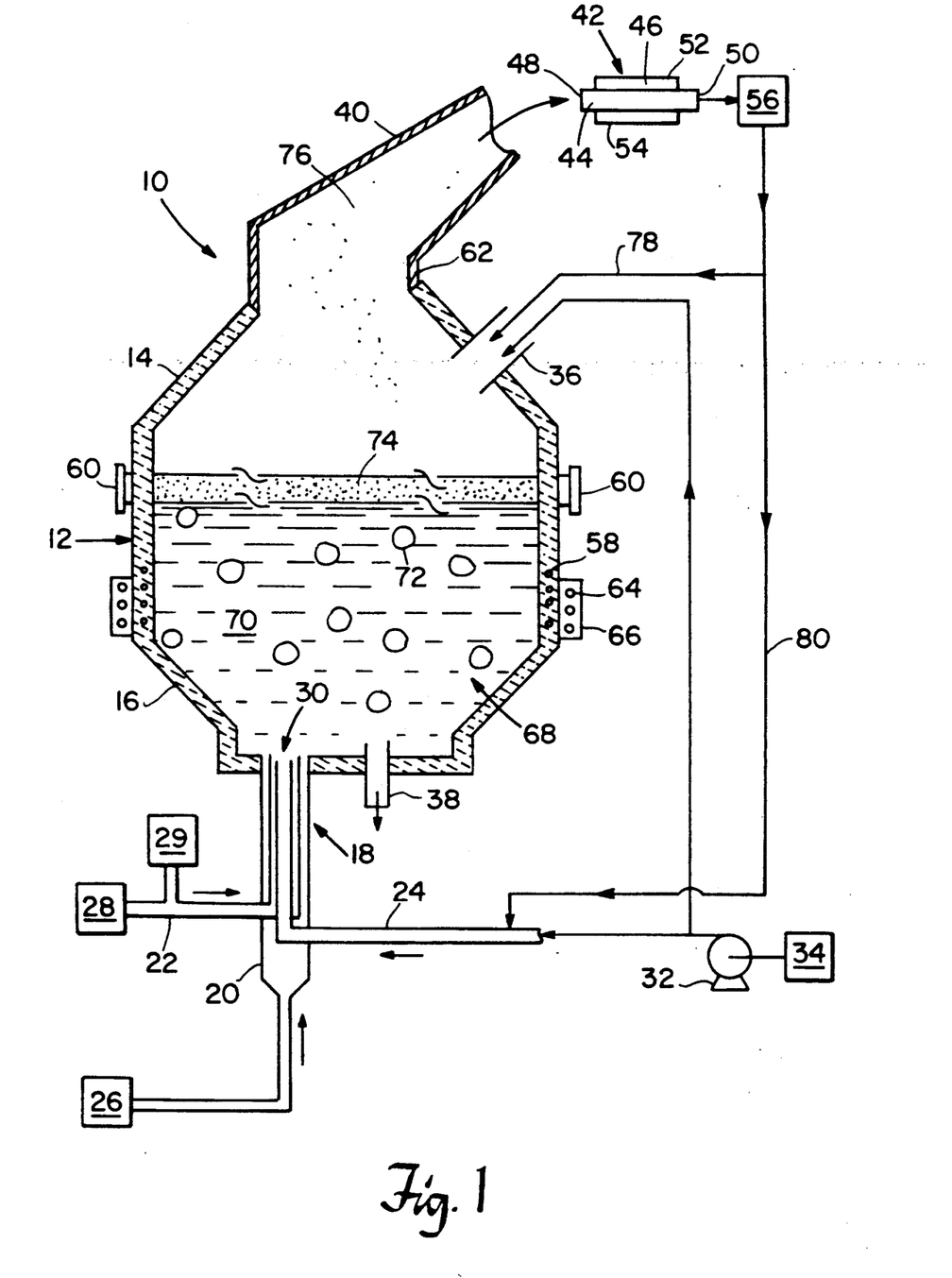
FIG. 1 is a schematic representation of a system for reducing the volume of radioactive compositions by employing the method of the invention.

System 10, shown in the Figure, is one illustration of a system suitable for conducting the method of the invention. System 10 includes reactor 12. Examples of suitable reactors include K-BOP, Q-BOP, argon-oxygen decarbonization furnace (AOD), EAF, etc., such as are known in the art of steel making. Reactor 12 has upper portion 14 and lower portion 16.

Tuyere 18 includes shroud gas tube 20, oxidizing agent inlet tube 22 and radioactive composition inlet tube 24. Shroud gas tube 20 extends from shroud gas source 26 to reactor 12. Oxidizing agent tube 22 extends from oxidizing agent source 28 to lower portion 16 of reactor 12. Oxidizing agent tube 22 is disposed within shroud gas tube 20 at tuyere opening 30. Radioactive composition inlet tube 24 is disposed within oxidizing agent tube 22 at tuyere opening 30. Pump 32 is disposed at radioactive composition inlet tube 24 to direct a suitable radioactive composition from radioactive composition source 34.

Tuyere 18 is dimensioned and configured for conjointly and continuously introducing a suitable radioactive composition and an oxidizing agent into reactor 12. It is to be understood, however, that a shroud gas, the radioactive composition and the oxidizing agent can be introduced to reactor 12 separately or intermittently or both, rather than conjointly or continuously or both. It is also to be understood that more than one tuyere 18 can be disposed in reactor 12 and that concentric, or multiple concentric tuyeres, can be employed for separate introduction of reactants, such as the radioactive component and the oxidizing agent, into reactor 12. For example, the radioactive composition can be introduced through a first double concentric tuyere, not shown, and the oxidizing agent can be separately introduced through a second double concentric tuyere, also not shown, as an alternative to employing tuyere 18. Double concentric tuyeres, such as for separate introduction of a radioactive composition and an oxidizing agent, can be located proximate to or remote from each other in reactor 12. Further, it is to be understood that oxidizing agent and radioactive composition can be introduced into reactor 12 by other suitable methods. For example, the radioactive composition can also be directed into reactor 12 through radioactive composition inlet 36 or by top-blowing the radioactive composition into reactor 12.

Bottom-tapping spout 38 extends from lower portion 16 and is suitable for removal of at least a portion of a molten bath from reactor 12. Material can also be removed by other methods, such as are known in the art. For example, material can be removed from reactor 12 by rotating reactor 12 or by employing a launder, not shown, extending from radioactive composition inlet 36. Alternatively, the launder can extend into reactor 12 through a tap hole, also not shown.

Off-gas outlet 40 is disposed at upper portion 14 of reactor 12 and extends to heat exchanger 42. Heat exchanger 42 has off-gas side 44 and cooling medium side 46. Off-gas side 44 has heat exchanger inlet 48 and heat exchanger outlet 50. Cooling medium side 46 has cooling medium inlet 52 and cooling medium outlet 54. Examples of suitable heat exchangers include water-cooled hoods, shell and tube heat exchangers, etc. A suitable cooling medium can be any medium for cooling off-gas in heat exchanger 42. Examples of suitable cooling media include, for example, water, ethylene glycol, ethyl benzene, alcohols, etc.

Scrubber means 56 is disposed at heat exchanger outlet 50. Scrubber means is suitable for exposing the off-gas to conditions sufficient to remove at least a portion of off-gas from off-gas stream. As an example, scrubber means is a scrubber which can include a wet-venturi scrubber, etc. Further, it is to be understood that off-gas can be cooled and separated by other suitable methods. In one embodiment, the off-gas is cooled and separated according to the method and system described in U.S. patent application Ser. No. 07/737,048, title "Method and System for Controlling Chemical Reaction in a Molten Bath," the teachings of which are incorporated herein by reference.

Induction coil 58 is disposed at lower portion 16 for heating reactor 12 or for initiating generation of heat within reactor 12. It is to be understood that, alternatively, reactor 12 can be heated by other suitable means, such as by oxyfuel burners, electric arc, etc. Trunions 60 are disposed at reactor 12 for manipulation of reactor 12 and off-gas outlet tube 40. Seal 62 is disposed between reactor 12 and off-gas outlet tube 40. Trunions 60 are suitable for allowing partial rotation of reactor 12 about trunions 60 without breaking seal 62. Alternatively, reactor 12 does not include trunions or a seal and does not rotate.

Coil 64 is disposed on exterior of reactor 12 for transferring heat from reactor 12 Coil 64 is covered by insulation 66 and contains a suitable heat transfer medium, such as water or liquid metal. The heat transfer medium is circulated through coil 64 by a suitable means, such as a pump, not shown, to thereby transfer heat from reactor 12.

A reaction zone within system 10 includes molten bath 68, slag layer 74 and gas layer 76. Molten bath 68 includes at least one metal, at least one oxide of a metal, or at least one salt of a metal, whereby oxidation of a radioactive first component or a second component of a radioactive composition will cause separation of the radioactive first component from the second component. Examples of suitable metals in molten bath 68 include iron, chromium, manganese, copper, nickel, cobalt, etc. It is to be understood that molten bath 68 can include a solution of metals. Also, it is to be understood that molten bath 68 can include oxides or salts of metals. Molten bath 68 can include more than one phase of molten metal, as disclosed in U.S. patent application Ser. No. 07/557,561, titled "Method and System for Forming Carbon Dioxide from Carbon Containing Material in a Molten Bath of Immiscible Metals," the teachings of which are incorporated herein by reference. For example, molten bath 68 can include substantially immiscible molten phases 70,72.

Molten bath 68 is formed by at least partially filling reactor 12 with at least one suitable metal. The metal is then heated to a suitable temperature by activating induction coil 64 or by other means, not shown. Where two immiscible metals are introduced to reactor 12, the metals separate during melting to form distinct molten phases 70,72.

Slag layer 74 is disposed on molten bath 68. Slag layer 74 is substantially immiscible with molten bath 68. Alternatively, system 10 does not include slag layer 74. Slag layer 74 includes at least one metal oxide. Examples of suitable metal oxides of slag layer 74 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of slag layer 74 include halogens, sulfur, phosphorus, heavy metals, etc. It is to be understood that slag layer 74 can include more than one metal oxide. Radioactive inorganic components of the radioactive composition can also be included in slag layer 74. Slag layer 74 can contain more than one phase. Typically, slag layer 74 is substantially fluid so that free radicals and other gases can pass across slag layer 74 from molten bath 68.

Gas layer 76 is disposed over molten bath 68 and, if present, slag layer 74. In one embodiment, gas layer 76 extends from upper portion 14 of reactor 12 through off-gas outlet 22 to scrubber means 56. Gas layer 76 includes off-gases which are reaction products, such as hydrogen, water vapor, carbon monoxide and carbon dioxide. The off-gas can include a radioactive first component of the radioactive composition.

Suitable operating conditions of system 10 include a temperature sufficient to oxidize a component of a radioactive composition directed into reactor 12, whereby a radioactive first component is separated from a second Component of the radioactive composition.

In one embodiment of the method of the invention, a radioactive composition is directed from radioactive composition source 34 into the reaction zone. The radioactive composition, the first oxidizing agent and the shroud gas are directed into molten bath 68 of reactor 12 from radioactive composition source 34, oxidizing agent source 28 and shroud gas source 26, respectively. It is to be understood that the radioactive composition can be directed into reactor by other suitable methods. For example, the radioactive composition can be directed into reactor 12 through radioactive composition inlet 36 as whole articles, such as radioactivity contaminated clothing, contaminated piping, etc.

The radioactive composition includes a radioactive first component and a second component, whereby oxidation of either component causes separation of the radioactive first component from the second component. Examples of suitable radioactive compositions include low-level radioactive wastes, such as various hospital wastes, contaminated clothing, contaminated glassware and spent ion exchange resins generated by chemical laboratories, etc. Examples of radioactive first components include: $^{32}P$; $^{35}S$; $^{51}Cr$; $^{54}Mn$; $^{55}Fe$; $^{58}Co$; $^{59}Fe$; $^{65}Zn$; $^{67}Ga$; $^{125}I$; $^{131}I$; $^{60}Co$; $^{3}H$; $^{90}Sr$; $^{137}Cs$; $^{63}Ni$; $^{63}Ni$ in activated metal; $^{14}C$; $^{14}C$ in activated metal; $^{94}Nb$ in activated metal; $^{59}Ni$ in activated metal; $^{99}Tc$; $^{129}I$; $\alpha$-emitting transuranic nuclides with half-lives of less than 5 years; $^{242}Cm$; $^{241}Pu$; etc.

The oxidizing agent is suitable for oxidizing a component of the radioactive composition in molten bath 68 to thereby cause separation of the radioactive first component from the second component. An "oxidizing agent," as that term is used herein, means an agent which can increase the positive charge or valence of an element by removing electrons from that element. Examples of suitable oxidizing agents include: oxygen gas or oxygen-containing compounds, such as calcium oxide; halogens; chlorine-containing compounds; fluorine-containing compounds; and high-valent metal cations, such as $Fe^{+3}$, $Cr^{+6}$ and $V^{+6}$; etc.

The shroud gas is suitable for cooling the region within reactor 12 proximate to tuyere 18 under the operating conditions of system 10. Examples of suitable shroud gases include nitrogen gas ($N_2$), steam, methane ($CH_4$), chlorobenzene ($C_6H_5Cl$), etc. In one embodiment, nitrogen gas is exposed to the region.

The radioactive composition directed into reactor 12 combines with molten bath 68 and can also combine with slag layer 74. In one embodiment, at least a portion of the radioactive first component and the second component, which are to be separated by the method of the invention, dissolve in molten bath 68 and/or slag layer 74. Contact of the radioactive composition with molten bath 68 or slag layer 74 exposes the radioactive composition to the oxidizing agent at a temperature sufficient to oxidize a component of the radioactive composition in molten bath 68 and thereby cause separation of the radioactive first component from the second component due to changes in, and, consequently, differences between the radioactive first component and the second component with respect to solubility, density, polarity, volatility, etc. In one embodiment, the temperature of the molten bath is in the range of between about 1,000° C. and about 2,000° C. The radioactive first component and the second component are separated by migration of either the radioactive first component or the second component. For example, a component can migrate from molten bath 68 to slag layer 74 or to gas layer 76. In another embodiment, either of the components can be oxidized in one of two or more immiscible molten phases of molten bath 68 and migrate to another molten phase. For example, radioactive first component can be oxidized in molten phase 70 and migrate to molten phase 72 of molten bath 68. Alternatively, both the radioactive first component and the second component migrate, wherein separation can be obtained by migration of the radioactive first component and the second component to different portions of the reaction zone. For example, the radioactive first component can migrate to slag layer 74 while the second component migrates to gas layer 76.

Separation of the radioactive first component from the second component is caused by oxidation of either the radioactive first component or the second component. For example, oxidation of the radioactive first component can cause the radioactive first component to migrate from molten bath 68 to slag layer 74, while the second component remains in molten bath 68, thereby separating the radioactive component from the second component. Separation of the two components significantly reduces the volume of the radioactive composition because the second component has been isolated from the radioactive first component and because, typically, radioactive compositions are comprised substantially of non-radioactive components.

In another embodiment of the method of the invention, either the radioactive first component or the second component is oxidized by a first oxidizing agent to form an intermediate component. The intermediate component separates from the remaining component of the radioactive composition either by migration of the intermediate component or by migration of the remaining component out of molten bath 68. Alternatively, the component can separate by migration of either the intermediate component or the remaining component from one immiscible molten phase to another immiscible phase of molten bath 68, such as from molten phase 70 to molten phase 72.

A second oxidizing agent is then directed into the reaction zone by a suitable means for reaction with the intermediate component. For example, the second oxidizing agent can be directed into molten bath 68 from second oxidizing agent source 29 through oxidizing agent tube 22 and tuyere 18 at lower portion 16 of reactor 12. Suitable second oxidizing agents include oxidizing agents which will react with the intermediate component. In one embodiment, the second oxidizing agent is a Group I or Group II metal or metal oxide. The second oxidizing agent is distinct from the first oxidizing agent. For example, in one embodiment, the first oxidizing agent can be fluorine and the second oxidizing agent can be oxygen gas. The second oxidizing agent reacts with the intermediate component to form a product. The product can migrate through the reaction zone to gas layer 76 for removal from reactor 12.

Gases, such as the product, the radioactive first component or the second component of the radioactive composition, which are released from molten bath 68 into gas layer 76, are directed through off-gas outlet 40 to heat exchanger 42. The gases are cooled in heat exchanger 42 and then directed to scrubber 56 for separation of components from the gas. An intermediate stream is thereby formed at scrubber 56 which can be treated, as described in U.S. patent application Ser. No. 07/737,048, the teaching of which are incorporated herein by reference. For example, the intermediate stream can be returned to molten bath 68 through conduit 78 or conduit 80, or can be treated by another means, such as by directing the intermediate stream to another reactor, not shown.

The following are illustrations of various applications of the method of the invention to reduce the volume of radioactive compositions having a radioactive first component and a second component.

ILLUSTRATION I

Iron piping or other metal storage containers and their contents, contaminated with radioactive uranium, is fed through radioactive composition inlet 36 into molten bath 68 of reactor 12. The radioactive first component of the radioactive composition is uranium. The second component is iron.

Oxygen gas, as a first oxidizing agent, is added continuously to molten bath 68 from oxidizing agent source 28 through oxidizing agent tube 22 of tuyere 18. Nitrogen gas, as a shroud gas, is added to molten bath 68 from shroud gas source 26 through shroud gas tube 20 in tuyere 18. Carbon can be present in molten bath 68. Molten bath 68 has a temperature of about 1800° K.

Figure 2:
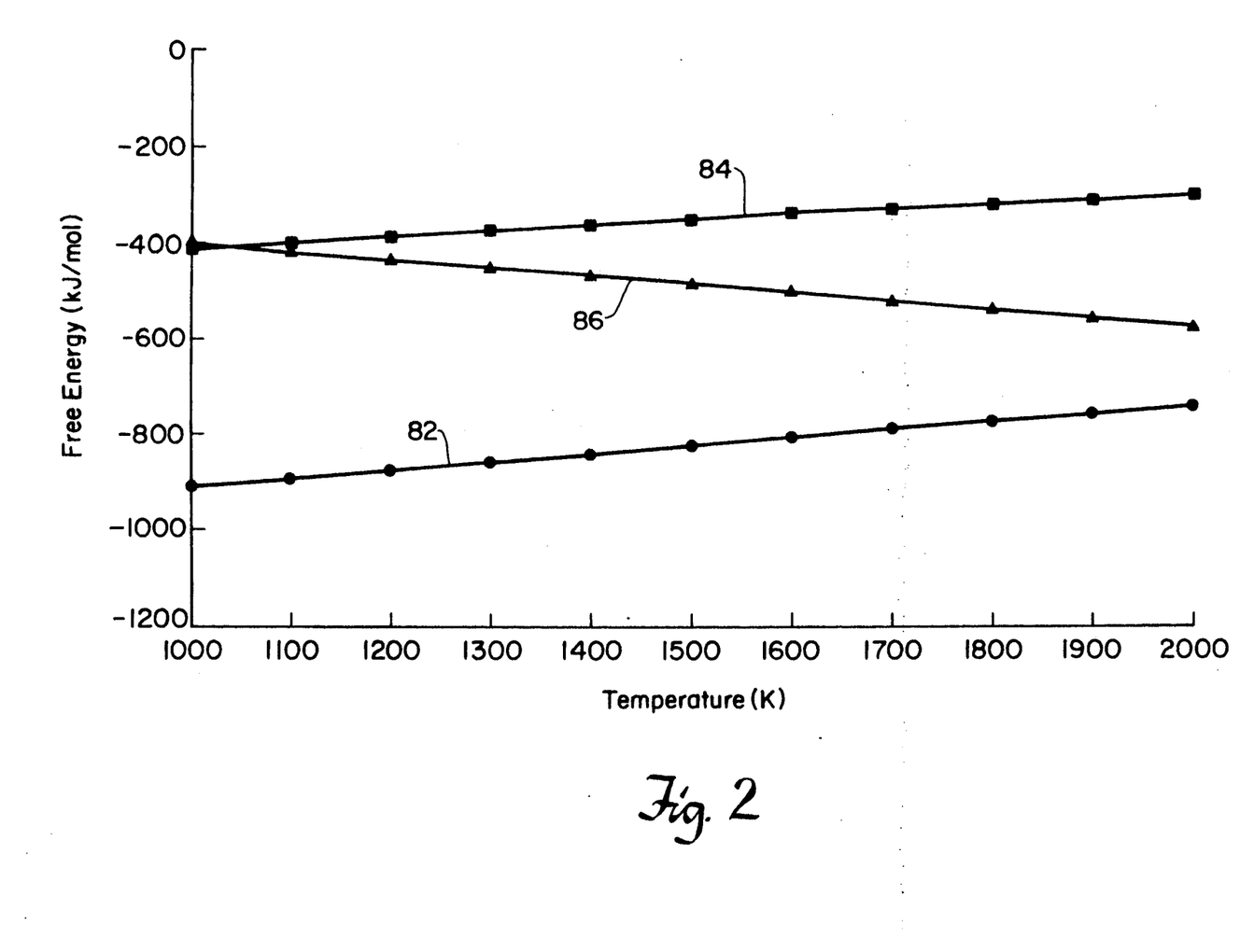
FIG. 2 is a plot of the free energies of oxidation of uranium, iron and carbon at the conditions of a molten bath employed in one embodiment of the method of the invention.

The radioactive first component of the radioactive composition is oxidized in molten bath 68 from uranium to uranium oxide by the first oxidizing agent. The reaction of the radioactive first component with the first oxidizing agent occurs preferentially to oxidation of iron or carbon molten bath 68 because, as can be seen in FIG. 2, the free energy of oxidation of uranium (Curve 82) is lower than that of iron (Curve 84) or carbon (Curve 86) at the temperature of molten bath 68. The radioactive first component migrates from molten bath 68 to slag layer 74. The second component of the radioactive composition is separated from the radioactive first component in molten bath 68 as the radioactive first component is oxidized. The volume of the radioactive composition is significantly reduced because the iron component has been separated from the radioactive first component, uranium. Slag layer 74, which includes radioactive first component, is removed from reactor 12 by a suitable means. The second component, iron, remains in molten bath 68. The second component can be removed from reactor 12 through bottom-tapping spout 38.

ILLUSTRATION II

The radioactive composition includes discarded electrical transformers, containing about ten percent polychlorinated biphenyl ($C_{12}H_6Cl_4$), and contaminated with trace amounts of radioactive cobalt in a concentration of about one hundred parts per million. The radioactive composition also includes about fifty percent iron and about forty percent copper. The radioactive first component of the radioactive composition is a solution of the cobalt, iron and copper. The second component is the polychlorinated biphenyl.

The radioactive composition is directed into molten bath 68 of reactor 12 from radioactive composition source 34 through radioactive composition inlet 36. Oxygen gas and calcium oxide are added, as oxidizing agents, to molten bath 68 from oxidizing agent source 28 through oxidizing agent tube 22. Nitrogen gas, as a shroud gas, is added to molten bath 68 from shroud gas source 26 through shroud gas tube 20 in tuyere 18. Molten bath 68 has a temperature of about 800 K.

The radioactive first component of the radioactive composition accumulates in molten bath 68. The second component of the radioactive composition is thermally decomposed in molten bath 68 and slag layer 74 to form atomic carbon, chlorine and hydrogen. At least a portion of the carbon is oxidized to form carbon monoxide gas and calcium chloride is produced from chlorine and lime. Hydrogen gas is also generated. The carbon monoxide and hydrogen gas migrate from molten bath 68 across slag layer 74 to off-gas layer 76 and then is discharged from reactor 12. The calcium chloride accumulates in slag layer 74.

ILLUSTRATION III

The radioactive composition includes radioactive ion exchange resin having a radioactive uranium isotope concentration of about two parts per million. The resin includes an organic component, polystyrene trimethylbenzlammonium salt. The radioactive first component of the radioactive composition includes uranium and chlorine, which are bound to the resin. The second component is the polystyrene trimethylbenzlammonium salt.

The radioactive composition is fed through tuyere 18 into molten bath 68 of reactor 12. Oxygen gas and calcium oxide are added as oxidizing agents to molten bath 68 from oxidizing agent source 28 through oxidizing agent tube 22 in tuyere 18. Nitrogen gas, as a shroud gas, is added to molten bath 68 from shroud gas source 26 through shroud gas tube 20 in tuyere 18. Molten bath 68 has a temperature of about 1800° K.

The radioactive first component of the radioactive composition is oxidized by the first oxidizing agent in molten bath 68 to form uranium oxide and calcium chloride. The radioactive first component then migrates from molten bath 68 to slag layer 74.

The second component of the radioactive composition thermally decomposes to elemental carbon, nitrogen and hydrogen components of polystyrene trimethylbenzlammonium, and is separated from the radioactive first component in molten bath 68 as radioactive first component is oxidized and migrates to slag layer 74. The nitrogen and hydrogen volatilize from molten bath 68. The carbon can oxidize to form carbon monoxide gas, which also migrates to gas layer 76. The total volume of radioactive material can be reduced by a ratio greater than about twenty to one.

ILLUSTRATION IV

A radioactive composition which includes calcium iodide ($CaI_2$) has a radioactive first component which is the iodine component of the calcium iodide, in the form of radioactive isotopes $^{125}I$, $^{129}I$ and $^{131}I$. The second component is the calcium component of the calcium iodide. The radioactive composition is fed from radioactive composition source 34 by pump 32 through radioactive composition tube 24 through tuyere opening 30 into molten bath 68 of reactor 12. Molten bath 68 includes nickel. Oxygen gas is directed into molten bath 68 as the first oxidizing agent from oxidizing agent source 28 through oxidizing agent tube 22. Nitrogen gas, as a shroud gas, is added to molten bath 68 from shroud gas source 26 through shroud gas tube 20. Molten bath 68 has a temperature of about 1800° K.

Figure 3:
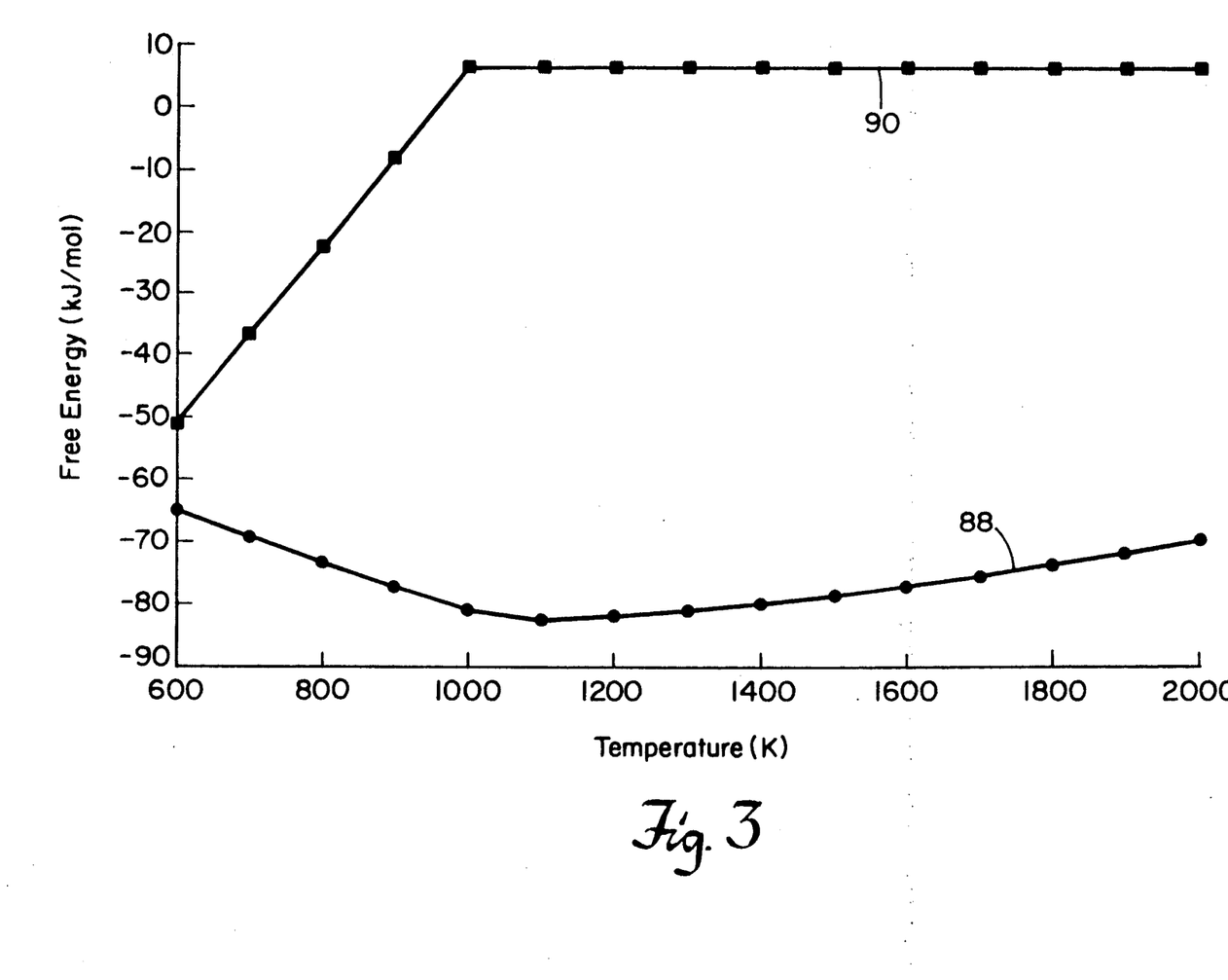
FIG. 3 is a plot of the free energies of reaction of iodine with a molten bath of nickel and calcium iodide with oxygen in another embodiment of the invention.

The second component of radioactive composition is oxidized to form calcium oxide and iodine ($I_2$). The first oxidizing agent reacts preferentially with the radioactive first component because the free energy of oxidation of the radioactive first component (Curve 88) is lower than that of the nickel (Curve 90) of molten bath 68, as can be seen in FIG. 3. The iodine volatilizes and migrates from molten bath 68 through slag layer 74 to gas layer 76 and out of reactor 12 through off-gas outlet tube 40. The second component migrates from molten bath 68 to slag layer 74 and accumulates in slag layer 74. Calcium fluoride ($CaF_2$) can be added to slag layer 74 to help maintain fluidity of slag layer 74.

ILLUSTRATION V

The radioactive composition includes iron contaminated with radioactive uranium. The radioactive first component is the radioactive uranium. The second component is the iron. The radioactive composition is fed through radioactive composition inlet 36 into molten bath 68 of reactor 12. Chlorine gas is directed into molten bath 68, as a first oxidizing agent, to molten bath 68 from oxidizing agent source 28 through oxidizing agent tube 22. Nitrogen gas, as a shroud gas, is added to molten bath 68 from shroud gas source 26 through shroud gas tube 20 in tuyere 18. Molten bath 68 has a temperature of about 1800° K.

Figure 4:
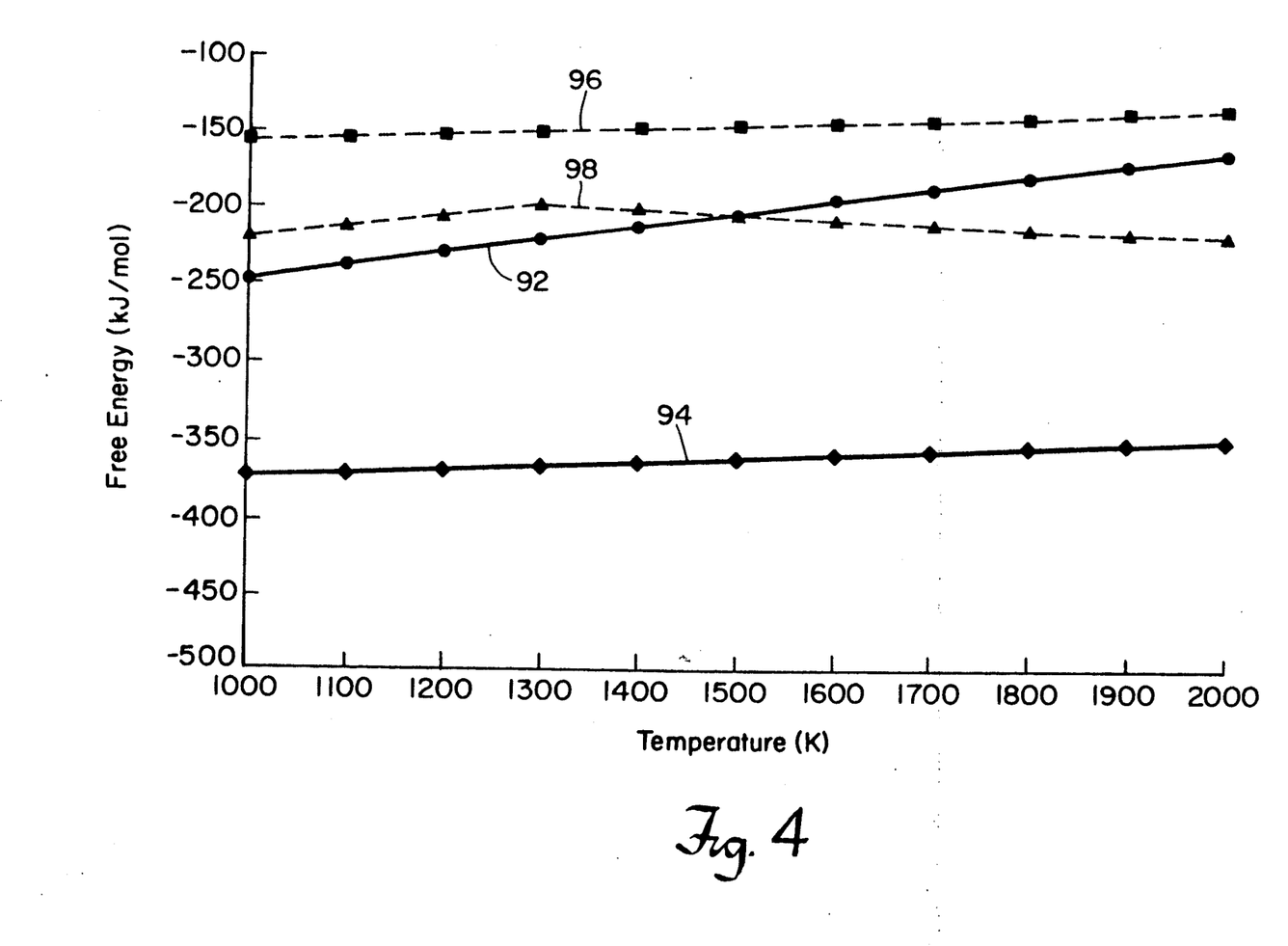
FIG. 4 is a plot of the free energies of reaction of chlorine, as an oxidizing agent, with iron and uranium according to still another embodiment of the method of the invention.

The radioactive first component of the radioactive composition is oxidized by the first oxidizing agent in molten bath 68 to form an intermediate component, uranium chloride ($UCl_4$). The first oxidizing agent reacts preferentially with the radioactive first component rather than the iron because the free energies of oxidation of the radioactive first component, uranium chloride (Curves 92,94), are lower than those of the iron (Curve 96,98) in molten bath 68, as can be seen in FIG. 4. The uranium chloride volatilizes and migrates from molten bath 68 through slag layer 74 to gas layer 76.

Figure 5:
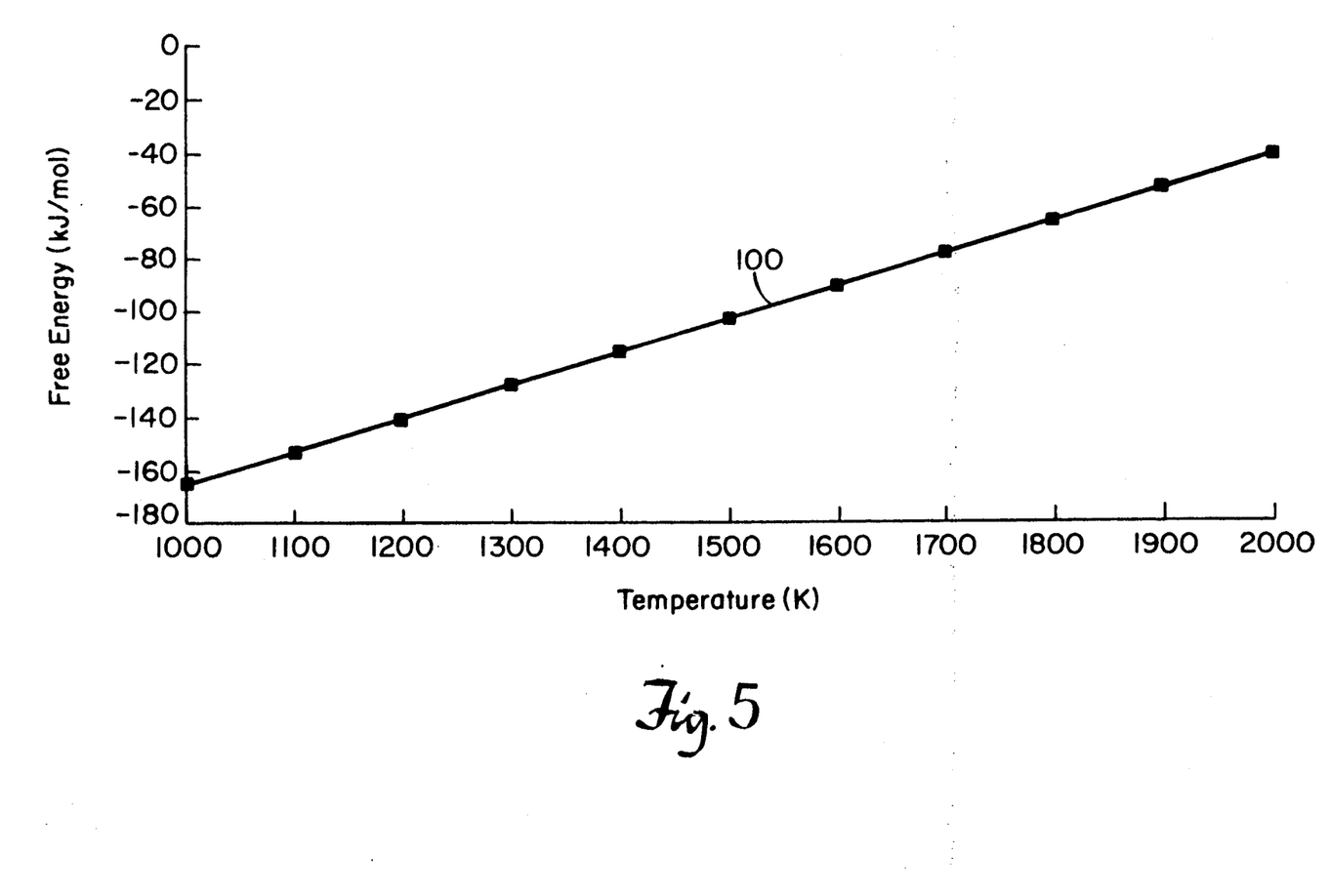
FIG. 5 is a plot of the free energies of oxidation of uranium chloride according to the embodiment referred to in the description of FIG. 4.

The intermediate component is then oxidized by oxygen gas, as a second oxidizing agent, which is added to gas layer 76 by a suitable means, such as top lancing or direct injection into the slag layer or at the gas layer/slag layer interface. The intermediate component, uranium chloride is oxidized to uranium oxide. Reaction of the intermediate component with the second oxidizing agent (Curve 100) is highly favorable, as shown in FIG. 5, and results in the formation of $UO_2$ powder and $Cl_2$ gas. The uranium oxide is a solid which settles in the reaction zone and accumulates in slag layer 74.

The second component of radioactive composition is separated from radioactive first component in molten bath 68 as radioactive first component is oxidized by first oxidizing agent. Second component, which is iron, remains in molten bath 68. The second component is removed through bottom-tapping spout 38.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for separating a radioactive first component from a second component of a radioactive composition, comprising the steps of:
   a) directing the radioactive composition into a reaction zone, the reaction zone including a first molten metal phase and a second phase, wherein oxidation of a component of the radioactive composition in the first molten metal phase will cause migration of a component of the radioactive composition from the first molten metal phase to the second phase; and
   b) directing a first oxidizing agent into the first molten metal phase, whereby a component of the radioactive composition is oxidized, causing migration of a component of the radioactive composition from the first.

2. A method of claim 1, further comprising the step of forming the reaction zone.

3. A method of claim 2, wherein the reaction zone includes a gaseous second phase.

4. A method of claim 3, wherein the first oxidizing agent oxidizes the radioactive first component of the radioactive composition.

5. A method of claim 4, wherein the reaction zone causes the oxidized radioactive first component to volatilize, whereby said radioactive first component migrates from said first molten metal phase to said gaseous second phase, thereby separating the oxidized radioactive first component from the second component.

6. A method of claim 2, wherein the reaction zone formed includes a second molten phase, whereby oxidized component formed in the first molten phase migrates from the first molten phase to the second molten phase.

7. A method of claim 6, wherein the first molten metal phase includes a first metal.

8. A method of claim 7, wherein the second molten phase of the reaction zone formed includes a metal oxide.

9. A method of claim 7, wherein the second molten phase of the reaction zone formed includes a salt.

10. A method of claim 7, wherein the second molten phase formed includes a second metal, whereby the second molten phase is substantially immiscible in the first molten metal phase.

11. A method of claim 2, wherein the first oxidizing agent oxidizes the second component of the radioactive composition.

12. A method of claim 11, wherein the reaction zone causes the oxidized second component to volatilize, thereby separating the oxidized second component from the radioactive first component.

13. A method of claim 12, wherein the second component includes a radioactive component.

14. A method of claim 6, wherein the first oxidizing agent reacts with the radioactive composition to form an intermediate component.

15. A method of claim 14, wherein the first oxidizing agent reacts with the radioactive first component of the radioactive composition to form the intermediate component.

16. A method of claim 14, wherein the first oxidizing agent reacts with the second component of the radioactive composition to form the intermediate component.

17. A method of claim 14, wherein the intermediate component which is formed migrates to the second molten phase and reacts with a second oxidizing agent in the second molten phase to form an oxidized product.

18. A method of claim 17, wherein the first oxidizing agent includes a halogen.

19. A method of claim 18, wherein the second oxidizing agent includes an oxygen-containing compound.

20. A method of claim 18, wherein the second oxidizing agent includes a fluorine-containing compound.

21. A method of claim 18, wherein the second oxidizing agent includes a Group I metal.

22. A method of claim 18 wherein the second oxidizing agent includes a Group II metal.

23. A method for separating a radioactive first component from a second component of a radioactive composition, comprising the steps of:
   a) directing the radioactive composition into a reaction zone, the reaction zone including a first molten metal phase and a second phase, in which a substantial portion of the radioactive composition dissolves in the first molten metal phase, and wherein oxidization of a dissolved component of the radioactive composition in the molten bath will cause migration of a component of the radioactive composition from the first molten metal phase to the second phase; and
   b) directing a first oxidizing agent into the first molten metal phase, whereby a dissolved component of the radioactive composition is oxidized, causing migration of a component of the radioactive composition from the first molten metal phase to the second phase, thereby separating the radioactive first component from the second component.

24. A method for separating a radioactive first component from a second component of a radioactive composition, comprising the steps of:
 a) directing the radioactive composition into a reaction zone, the reaction zone including a molten bath with a first molten phase and a second molten phase, wherein oxidation of the radioactive first component of the radioactive composition in the molten bath will cause separation of the radioactive first component from the second component; and
 b) directing a first oxidizing agent into the molten bath, whereby a radioactive component of the radioactive composition is oxidized, thereby causing separation of the radioactive first component from the second component by migrating from the first molten phase to the second molten phase.

25. A method of claim 24, wherein the first molten phase includes a first metal.

26. A method of claim 25, wherein the second molten phase of the reaction zone formed includes a metal oxide.

27. A method for reducing the volume of a radioactive composition by separating a radioactive first component from a second component of the radioactive composition, comprising the steps of:
 a) directing the radioactive composition into a reaction zone, the reaction zone including a molten bath with a first molten phase and a second molten phase, wherein oxidation of a second component of the radioactive composition in the molten bath will cause separation of the radioactive first component from the second component; and
 b) directing a first oxidizing agent into the molten bath, whereby the second component of the radioactive composition is oxidized, thereby causing separation of the second component from the radioactive first component by migrating from the first molten phase to the second molten phase.

28. A method of claim 27 wherein the first molten phase includes a first metal.

29. A method of claim 28 wherein the second molten phase of the reaction zone formed includes a metal oxide.

* * * * *

UNITED STATES PATENT AND TRADEMARK OFFICE
CERTIFICATE OF CORRECTION

PATENT NO.   : 5,202,100

DATED        : April 13, 1993

INVENTOR(S)  : Christopher J. Nagel, Robert D. Bach and William M. Haney, III

It is certified that error appears in the above-identified patent and that said Letters Patent is hereby corrected as shown below:

Claim 1, Column 9, line 58, after the word "first", insert --molten metal phase to the second phase, thereby separating the radioactive first component from the second component--.

Signed and Sealed this

Seventh Day of December, 1993

Attest:

BRUCE LEHMAN

Attesting Officer

Commissioner of Patents and Trademarks